May 24, 1927.  
O. B. WOODROW  
1,629,763  
CLUTCH MECHANISM FOR WASHING MACHINES  
Original Filed April 13, 1925
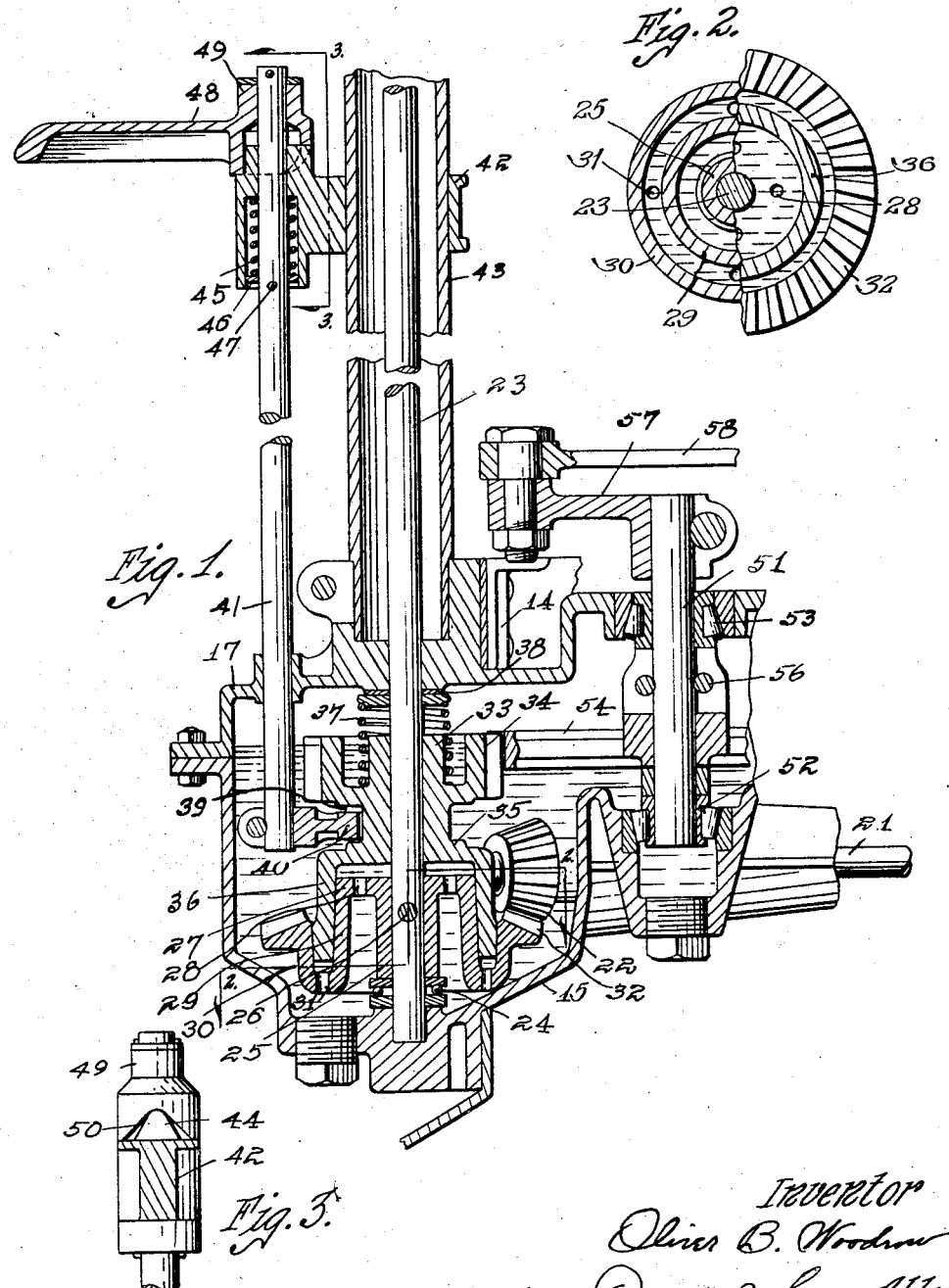

Patented May 24, 1927.

1,629,763

UNITED STATES PATENT OFFICE.

OLIVER B. WOODROW, OF NEWTON, IOWA.

CLUTCH MECHANISM FOR WASHING MACHINES.

Original application filed April 13, 1925, Serial No. 22,797. Divided and this application filed November 2, 1925. Serial No. 66,349.

The object of my invention is to provide a clutch mechanism of simple, durable and inexpensive construction which is particularly adapted to be used in connection with a washing machine having means for actuating the washing machine proper and also for actuating a wringer, said clutch mechanism being adapted to operate one of these mechanisms independently of the other, and is a divisional application of my co-pending application for Letters Patent on a driving mechanism for washing machines, filed April 13, 1925, Serial Number 22,797.

More specifically it is my object to provide a mechanism of this class in which the parts most subject to wear are grouped and assembled in a small space and all contained within a gear case which may be filled with oil so that said working parts run continuously in oil with obviously advantageous results.

A further object is to provide an improved clutch device as one of the units of said mechanism and designed to be contained within said gear case and immersed in oil, which clutch mechanism is of simple, durable and inexpensive construction and utilizes the oil itself to mechanically retard the gripping action of the clutch.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a central, vertical, sectional view of my improved device.

Figure 2 is an enlarged, detail, sectional view taken on the line 2—2 of Figure 1.

Figure 3 is a detail sectional view taken on the line 3—3 of Figure 1.

Referring to the accompanying drawings, I have used the reference numeral 15 to indicate a gear casing supported by means of frame members not shown. The top of the gear casing is indicated generally by the numeral 17, and is secured to a circular angle bar 14 also rigidly secured to the supporting frame for the gear casing 15. The gear casing 15 is designed to carry a drive shaft 21 which has a beveled driving pinion 22 on its end within the gear casing.

Extending vertically through the gear case is a wringer drive shaft 23 having at its lower end a ball bearing 24. Fixed to this shaft 23 near its lower end is a combined clutch member and bevel gear device which comprises a hub portion 25 rigidly connected by a pin 26 to the shaft 23. At the top of the hub portion is an outwardly extended part 27 formed with a series of oil passageways 28. At the outer end of the part 27 is a downwardly projecting conical clutch flange member 29, and at the lower end of the member 29 is a flange extended outwardly and then upwardly at 30, thus forming a substantially V-shaped groove, both adjacent faces of which provide clutching surfaces for the mating clutch member. This flange is formed at its bottom with oil passageways 31 and at the outer upper portion of the flange 30 there is formed a bevel gear 32, the latter being arranged in mesh with the bevel pinion 22.

The coacting clutch member comprises a body portion 33 loosely mounted upon the shaft 23 above the clutch member 29. This body portion 33 is formed at its upper end with a gear wheel 34 and at its lower end it is formed with an outwardly extended flange 35 above the oil passageways 28, and also with a downwardly extended conical clutch member 36 shaped to coact with the conical clutch member 29 and also to enter the space between the parts 29 and 30, and when in its lower position it tightly fits both adjacent faces of the parts 29 and 30, and forms clutching contact therewith. This clutch member 36 is yieldingly held in position in clutching engagement with the clutch member 29 by a coil spring 37 interposed between the central portion of the gear wheel 34 at its lower end and a washer 38 at its upper end, which washer bears against the gear case cover 17 through which the shaft 23 is projected.

Formed in the central portion of the clutch member 33 is an annular groove 39 into which is projected an arm 40 fixed to a shaft 41 which is slidingly mounted in the gear case cover 17, and it serves the purpose of elevating the upper clutch member to position out of clutching engagement with the lower clutch member.

The means for raising and lowering the shaft 41 preferably comprises a stationary bracket 42 mounted on the tubular housing 43 for the shaft 23. This bracket 42 is preferably provided with a stationary cam shaped lug 44 at its upper end, as shown in Figure 3, and also is provided with a coil spring 45 at its lower end engaging the bracket 42 at its top, and also engaging a washer 46 at its bottom, which washer is secured by a pin 47 to the shaft 41, thus tending to yieldingly hold the shaft 41 at its downward limit of movement.

Rotatively mounted upon the shaft 41 is a lever 48 having a circular head 49 surrounding the upper end of the shaft 41 and also having a cam shaped flange 50 extending downwardly and designed to engage and coact with the cam shaped lug 44. The shaft 41 is held normally, by the spring 45, at its downward limit of movement, but when this lever 48 is moved laterally in either direction, the cam 50, traveling upon the cam 44, elevates the shaft 41 against pressure of the spring 45 and holds it in such elevated position.

Rotatively mounted within the gear case is the upright drive shaft 51 for the washing machine. This drive shaft is mounted with its lower end in a thrust roller bearing 52 at the lower part of the gear case, and with its upper end in a roller bearing 53 in the gear case cover. Fixed to its central portion within the gear case is a gear wheel 54 in mesh with the gear wheel 34, and these gear wheels are of such relative size that they will always remain in mesh when the gear wheel 34 is either in its elevated or its lowered position. The gear wheel 54 is preferably firmly fixed to the shaft 51 by pins 56. Fixed to the upper end of the shaft 51 above the gear case 15 is a short crank 57 connected by a pitman 58, said pitman being designed to operate the washing machine agitator.

In practical use attention is called to the fact that with my improved construction and arrangement of parts, all of the gear devices, and the clutch for transmitting power from the drive shaft 21 to either the wringer drive shaft 23 or the washing machine drive shaft 51, are contained within a tightly enclosed gear case, which is filled with oil so that all of these parts are constantly lubricated and the oil is prevented from working out of the gear case in such a manner as might come in contact with the garments being used in connection with the washing machine. Furthermore, the gear case itself forms a part of, and is firmly connected with, the stationary frame of the machine, in that the lower end of the gear case is securely fixed to a lower stationary frame member and the upper end of the gear case is firmly fixed to the frame member 14.

The combination of the clutch members with the integral gears on each of them, together with the co-operating parts thereof, is highly advantageous in a structure of this character. With my improved construction the main drive shaft 21 constantly rotates the wringer shaft 23 through the gears 22 and 32. This gear 32 is formed as an integral part of the lower clutch member, which in turn is fixed to the shaft 23, thus making an extremely simple, durable and efficient means for driving the shaft 23, but in addition to its function of driving the shaft 23, the gear 32 is formed with a clutch member, which clutch member is machined in such a manner as to be accurately centered relative to the gear 32. The upper clutch member is formed with a clutch device to coact with the lower clutch member, and is also formed with an integral gear wheel 34 to drive the washing machine operating shaft 51, and by this arrangement the driving mechanism for the washing machine is extremely simple, durable and efficient in construction, regardless of the clutch element. In other words, a simple, durable and efficient clutching mechanism is provided in the combination, without the addition of any separate parts that are liable to get out of alinement, or that need separate bearings and attachments; and furthermore all of said working parts are closely assembled and constantly run in oil in the same gear case.

In addition to the foregoing advantages, my improved clutch element of itself is a very efficient structure. When immersed in oil, and assuming that the upper clutch member is elevated out of working engagement with the lower clutch member, and that the shaft 23 is running and the shaft 51 is stationary, and assuming further that it is desired to rotate the shaft 51 which is designed to be connected to, say for instance, a tub full of water and clothes, and which requires a relatively great initial force in order to start it, then the operator moves the upper clutch member downwardly. When so doing the oil, that is contained between the part 27 of the lower clutch member and the adjacent part of the upper clutch member, is slowly forced out through the openings 28 and in addition to this the oil, that is contained within the cup shaped flange of the lower clutch member, will be slowly driven out through the openings 31 in the lower clutch member by the clutching flange 36 of the upper clutch member.

It is obvious that in the event that there was no oil in the gear case, and the upper clutch member was moved rapidly downwardly, it would quickly assume a clutched condition with relation to the lower clutch member, and a heavy overload would instantly be thrown on the electric motor or other prime mover with obviously disastrous results. However, by means of this retarding action of the oil it is obvious that when the upper clutch member approaches gripping contact with the lower clutch member, it will reach first a relatively slight driving engagement with the lower clutch member, and this driving engagement will increase in intensity for a considerable period, depending on the size of the oil discharge openings until finally a complete clutch engagement has been attained, and during this time that has elapsed from the time when the clutch is only slightly in engagement until full clutching engagement has been attained, the load of the washing machine will have been gradually started and will slowly reach its maximum load without subjecting the electric motor to undue strains for starting purposes.

I claim as my invention:

1. In a mechanism of the class described, the combination of a shaft, a conical clutch member fixed to the shaft, said clutch member beyond its clutching face being extended outwardly and then at an angle slightly divergent from the working face of the clutch member, a second clutch member slidingly mounted on the shaft and having a substantially conical shaped working face to coact with the working face of the first named clutch member, a casing in which said parts are contained, said casing being designed to also contain oil, said fixed clutch member being formed with oil passageways, whereby when the sliding clutch member is moved toward the fixed clutch member, oil contained between the sliding clutch member and the fixed clutch member will be forced out through said openings and the clutching action retarded thereby.

2. In a clutch of the class described, the combination of a case capable of retaining oil, a shaft rotatively mounted in said case, a clutch member fixed to the shaft and formed with a clutching flange having a substantially V-shaped circular groove formed in it, and having openings formed near the apex of said V-shaped groove, a coacting clutch member slidingly mounted on the shaft and having a flange designed to enter said V-shaped groove, and when at one limit of its movement form a clutching contact with said V-shaped groove, said parts being so arranged that when oil is supplied within the case the clutching action will be retarded during the time that oil is being forced out through said openings, said clutch members having substantially flat faces between their body portions, one of which is provided with openings for the passage of oil during the movement toward clutching position.

OLIVER B. WOODROW.